(12) United States Patent
Miyanaga

(10) Patent No.: US 8,794,880 B2
(45) Date of Patent: Aug. 5, 2014

(54) CORE CUTTER

(75) Inventor: Masaaki Miyanaga, Miki (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 1176 days.

(21) Appl. No.: 12/664,643

(22) PCT Filed: Jun. 15, 2007

(86) PCT No.: PCT/JP2007/062102
§ 371 (c)(1),
(2), (4) Date: May 20, 2010

(87) PCT Pub. No.: WO2008/152726
PCT Pub. Date: Dec. 18, 2008

(65) Prior Publication Data
US 2010/0226728 A1    Sep. 9, 2010

(51) Int. Cl.
*B23B 51/04* (2006.01)
(52) U.S. Cl.
CPC .................................... *B23B 51/04* (2013.01)
USPC ........................................ 408/204; 408/206
(58) Field of Classification Search
USPC ................... 408/204, 206, 207, 209
See application file for complete search history.

(56) References Cited

U.S. PATENT DOCUMENTS

| | | | | |
|---|---|---|---|---|
| 2,613,710 A | * | 10/1952 | Emmons | 408/213 |
| 3,854,840 A | * | 12/1974 | Miyanaga | 408/204 |
| 4,297,059 A | * | 10/1981 | Miyanaga | 408/202 |
| 4,408,935 A | * | 10/1983 | Miyanaga | 408/206 |
| 4,968,192 A | * | 11/1990 | Hamilton | 408/144 |
| 5,035,550 A | * | 7/1991 | Ajimi | 408/204 |
| 5,167,475 A | * | 12/1992 | Miyanaga | 408/204 |
| 5,246,318 A | * | 9/1993 | Merrill | 408/204 |
| 5,934,845 A | * | 8/1999 | Frey | 408/68 |

(Continued)

FOREIGN PATENT DOCUMENTS

| | | | |
|---|---|---|---|
| DE | 3322887 A1 | * | 1/1985 |
| DE | 4242909 A1 | | 6/1994 |

(Continued)

OTHER PUBLICATIONS

International Search Report for PCT/JP2007/062102, dated Aug. 28, 2007.

(Continued)

*Primary Examiner* — Andrea Wellington
*Assistant Examiner* — Alan Snyder
(74) *Attorney, Agent, or Firm* — Marshall, Gerstein & Borun LLP

(57) ABSTRACT

A core cutter includes a tubular body portion and a plurality of cutting blades arranged at a tip end of the body portion at predetermined intervals in a circumferential direction. At least one cutting blade serves as an inner cutting blade, and the remaining cutting blades serve as outer cutting blades. Through grooves penetrate a tip end of the body portion to open toward a tip end side of the core cutter. Each of the cutting blades having the same circumferential-direction size as the through groove. Gullets are configured to discharge the chips, each of the gullets formed by an outer peripheral surface. The cutting blades are welded to through grooves such that a radially inner end of an axial-direction tip end portion of each of the cutting blades coincides with or substantially coincides with a peripheral surface of an axial-direction tip end portion of the gullet.

7 Claims, 9 Drawing Sheets

(56) References Cited

U.S. PATENT DOCUMENTS

| | | | |
|---|---|---|---|
| 6,786,684 B1 * | 9/2004 | Ecker | 408/204 |
| 7,140,814 B2 * | 11/2006 | Singh et al. | 408/211 |
| 7,611,312 B2 * | 11/2009 | Miyanaga | 408/204 |
| 7,632,049 B2 * | 12/2009 | Omi et al. | 408/206 |
| 7,674,078 B1 * | 3/2010 | Buzdum et al. | 408/1 R |
| 2004/0013482 A1 * | 1/2004 | Gillet et al. | 408/204 |
| 2007/0065244 A1 * | 3/2007 | Miyanaga | 408/204 |
| 2007/0104548 A1 * | 5/2007 | Rompel | 408/206 |
| 2008/0298915 A1 * | 12/2008 | Miyanaga | 408/206 |

FOREIGN PATENT DOCUMENTS

| | | |
|---|---|---|
| DE | 4242909 A1 * | 6/1994 |
| EP | 0 420 602 A2 | 4/1991 |
| EP | 1 637 262 A1 | 3/2006 |
| EP | 1637262 A1 * | 3/2006 |
| JP | 57-096710 | 6/1982 |
| JP | 60-131105 | 7/1985 |
| JP | 04-141309 | 5/1992 |
| JP | 6-15919 | 3/1994 |
| JP | 11-129110 A | 5/1999 |
| JP | 2003-231013 | 8/2003 |
| WO | WO-2004/108333 | 12/2004 |

OTHER PUBLICATIONS

Extended European Search Report for EP 07 745 357.9, dated Nov. 10, 2010.

* cited by examiner

CORE CUTTER

TECHNICAL FIELD

The present invention relates to a core cutter, and particularly to a core cutter preferably used to drill holes in a composite material.

BACKGROUND ART

When drilling a hole having a comparatively large diameter in a plate-shaped material, a core cutter is conventionally used in light of high drilling efficiency thereof and fineness of an edge of a hole drilled thereby.

In the case of the core cutter having high drilling efficiency, a technical problem is how to smoothly discharge chips. Moreover, a method for solving this problem varies depending on a target object to be drilled, i.e., depending on whether a hole is drilled in wood, concrete, or metal.

For example, when drilling a hole in wood, slits each extending for a predetermined length from a tip end (lower end) of the core cutter to a base end thereof in an axial direction (hole drilling direction) of the core cutter are formed on a peripheral wall of a body portion of the core cutter. With this, the chips are smoothly discharged through the slits to outside. Moreover, when drilling a hole in concrete, the chips are comparatively fine powder. Therefore, cutting blades of the core cutter are formed to project outwardly or inwardly from an outer peripheral surface or inner peripheral surface of the body portion of the core cutter. With this, an adequate gap is formed between the core cutter and an inner peripheral surface of the hole. Thus, the chips are smoothly discharged to outside. Further, when drilling a hole in metal, a tip end portion (lower end portion) of the body portion of the core cutter at which the cutting blades are formed is formed to be thick, and the cutting blades are formed at a rotational-direction front end of this thick portion and are formed at a rotational-direction front portion (in other words, between the thick portions in a rotational direction) concavely toward an inner peripheral side. With this, a discharging groove is formed. Thus, the chips are smoothly discharged through the discharging groove to the base end side. Examples of such prior art are Patent Documents 1 and 2.

Patent Document 1: Japanese Laid-Open Patent Application Publication Hei 4-141309
Patent Document 2: Japanese Laid-Open Patent Application Publication 2003-231013

DISCLOSURE OF THE INVENTION

Problems to be Solved by the Invention

However, when drilling a hole in a composite material, specifically, in a composite material formed such that a metal plate formed on a surface thereof, a wooden plate material formed inside the metal plate, and an earthen plate material formed inside the wooden plate material, and the like are layered, the chips of all of these materials need to be smoothly discharged.

Here, a future task is to further improve the above-described high drilling efficiency that is one of features of the core cutter.

Generally speaking, an effective method for achieving the above task is to reduce the thickness of the body portion of the core cutter and the thickness of the cutting blade in a thickness direction (radial direction) to reduce the amount of cutting when drilling.

However, in a case where the thickness of the body portion is reduced, a distortion resistance (stiffness) of the body portion with respect to a rotational torque applied to the body portion at the time of drilling, especially the rotational torque applied to the vicinity of the cutting blade, i.e., a tip end portion of the body portion deteriorates. Therefore, in this case, to improve the distortion resistance of the tip end portion of the body portion, it is preferable that a tip end of the body portion be formed in a ring shape which is structurally uninterrupted over an entire circumference of the tip end of the body portion. However, in accordance with this configuration, the chips cannot move from a radially inner side of the body portion to a radially outer side of the body portion. Therefore, a chip discharging performance of the core cutter deteriorates, i.e., conflicting technical problems exist.

The present invention was made under such circumstances, and an object of the present invention is to provide a core cutter capable of smoothly discharging the chips when drilling a hole in a composite material formed such that a plurality of materials are layered and capable of maintaining a desired stiffness thereof even if a drilling performance thereof is further improved.

Means for Solving the Problems

The object of the present invention can be achieved by the core cutter configured as below.

To be specific, a core cutter according to the present invention includes: a tubular body portion; and a plurality of cutting blades arranged at a tip end of the body portion at predetermined intervals in a circumferential direction, at least one of the cutting blades serving as an inner cutting blade configured to cut an inner peripheral side portion, the remaining cutting blades serving as outer cutting blades configured to cut an outer peripheral side portion, wherein: a radial-direction thickness of the body portion is made thin while maintaining distortion resistance of the body portion; through grooves configured to penetrate the body portion in the radial direction are formed at the tip end of the body portion so as to open toward a tip end side of the core cutter; the cutting blades are respectively attached to the through grooves, each of the cutting blades having a circumferential-direction size equal to a circumferential-direction size of the through groove and being constituted by a block separately from the body portion; each of the gullets configured to discharge chips is formed on a rotational-direction front side of the cutting blade, each of the gullets being formed by an outer peripheral surface that is a part of the body portion, the outer peripheral surface having a tapered curved surface formed such that the outer peripheral surface approaches to an inner peripheral surface that is a part of the body portion as the outer peripheral surface extends toward the tip end of the body portion; and the blocks forming the cutting blades are respectively welded to the through grooves such that a radially inner end of an axial-direction tip end portion of each of the cutting blades coincides with or substantially coincides with an axial-direction tip end portion of the gullet in the radial direction.

In accordance with the core cutter according to the present invention configured as above, since the radial-direction thickness of the body portion is thin, an effective radial-direction width cut by the blocks forming the plurality of cutting blades (width of a ring-shaped portion cut by the rotation of the cutting blades) can be narrowed. Therefore, a total cut amount when drilling is reduced, so that drilling efficiency can be improved.

Moreover, in accordance with this configuration, since the tip end portion of the core cutter is structurally integrally formed in a ring shape using the cutting blades attached thereto, required distortion resistance can be obtained.

In addition, as described above, the through groove to which the block is attached is formed on a rotational-direction rear side of the tapered curved surface forming the gullet at the tip end portion of the body portion, and the block is welded to the through groove such that an inner peripheral end of the axial-direction tip end of the block coincides with or substantially coincides with the tip end portion of the body portion. Therefore, the chips generated by the blocks that are the cutting blades, including the chips generated by the inner peripheral portion of the tip end of the core cutter, are guided by the gullets, each adjacently located on a rotational-direction front side of the block, to gaps each formed between the hole drilled by a radially outer edge of the outer cutting blade of the core cutter and the outer peripheral surface of the core cutter. Thus, the chips can be efficiently discharged to the outside of the hole.

In the core cutter, the outer peripheral surface of the body portion which surface forms the gullet is connected to the inner peripheral surface that is a part of the body portion so as to coincide with or substantially coincide with the inner peripheral surface in the radial direction at an axial-direction tip end of the body portion. This is preferable in that the chips can be further efficiently discharged.

In the core cutter, the cutting blade includes a radially inner cutting blade portion configured to cut the inner peripheral side portion and a radially outer cutting portion located on a radially outer side of the radially inner cutting blade portion and configured to cut the outer peripheral side portion; in a rotational direction, a cutting blade portion located at a rotational-direction tip end of the radially outer cutting blade portion is located behind a cutting blade portion located at a rotational-direction tip end of the radially inner cutting blade portion; and when viewed from a bottom surface of the core cutter, a radial-direction boundary between the radially inner cutting blade portion and the radially outer cutting blade portion is formed by a step formed in the rotational direction. With this, the chips generated by the cutting blades become half dimension of the cutting blade in width, so that the chips can be more smoothly discharged through the gaps each formed between the gullet and the drilled hole or between the outer peripheral surface of the core cutter and the drilled hole.

In the core cutter, a configuration in which the radially inner end of the axial-direction tip end portion of the cutting blade coincides with or substantially coincides with the axial-direction tip end portion of the gullet is realized such that a connection portion where the axial-direction tip end portion of the gullet and the cutting blade are connected to each other in the circumferential direction is curved or bent in the radial direction so as to correspond to a position of the radially inner end of the cutting blade. With this, it is possible to increase the degree of freedom of the radial-direction arrangement of the cutting blade formed by the block. Even in such case, to realize smooth cutting, it is necessary that the connection portion of the gullet, to be more precise, the inner peripheral surface of the body portion where the gullet is formed coincides with the inner end of the cutting blade or is located on a slightly radially outer side of the inner end of the cutting blade.

In the core cutter, a thick portion is formed at a portion located on a rotational-direction rear side of the through groove at the tip end of the body portion, the thick portion being configured such that an outer peripheral surface thereof is located on a radially inner side of a radial-direction thickness of the cutting blade provided at the through groove and located on a radially outer side of a peripheral surface of the gullet. With this, the block that is the cutting blade can be further strongly welded to the body portion. In addition, a wider gap is formed between the peripheral surface of the gullet of the core cutter and the inner peripheral surface of the drilled hole when drilling. Therefore, the chips can be more smoothly discharged.

In the core cutter, the through groove has a plurality of contact surfaces configured to face in different directions from one another and contact the cutting blade when the block forming the cutting blade is attached to the through groove; the block has a plurality of contact surfaces corresponding to the contact surfaces of the through groove; and the block that is the cutting blade is welded to the through groove such that the contact surfaces of the block respectively contact the contact surfaces of the through groove. With this, even if external force is applied to the cutting blade in any direction, the block is less likely to fall off. Moreover, since the position of the block is accurately determined, high positioning accuracy can be obtained.

In the core cutter, a plurality of the cutting blades serving as the inner cutting blades are arranged in a region equal to or smaller than half an entire region of the core cutter in the circumferential direction or arranged in a region substantially half the entire region of the core cutter in the circumferential direction. With this, after the drilling, a substantially cylindrical cut portion remaining on a radially inner side of the core cutter can be smoothly removed from the core cutter.

The core cutter further includes: a first center drill portion having a center located at a rotational center portion of the core cutter and configured to be located on an axial-direction tip end side of the core cutter; and a second center drill portion configured to be located on an axial-direction rear end side of the first center drill portion and displaced from the rotational center portion, and further configured such that an outer end of a rotation trajectory thereof is larger than an outer end of a rotation trajectory of the first center drill portion in the radial direction, wherein the center drills configured to fulfill a positioning function when drilling are arranged such that the second center drill portion is displaced toward a side across the rotational center from a side where the inner cutting blades are arranged in the circumferential direction. With this, after the drilling, a substantially doughnut cut portion remaining on the radially inner side of the core cutter having the center drill can be smoothly removed from the inside of the core cutter.

Effects of the Invention

In accordance with the core cutter of the present invention, it is possible to provide a core cutter capable of smoothly discharging chips in the case of drilling a hole in a composite material formed such that a plurality of materials are layered, and maintaining desired stiffness while improving drilling performance.

BRIEF DESCRIPTION OF THE DRAWINGS

FIG. 3 is a partially enlarged bottom view of a portion N shown in FIG. 2 by a circle drawn by a chain double-dashed line and shows the configurations of the cutting blades, the gullets, and the like.

FIG. 4 is a partially enlarged side view of a tip end portion of the core cutter of FIG. 1 and shows the configurations of the cutting blades, the gullets formed in front of the cutting blades in a rotational direction of the core cutter, and the like.

FIG. 11 are diagrams showing appearance configurations of a cutting blade (tip) of the outer cutting blade attached to the through groove.

FIG. 12 are diagrams showing appearance configurations of a cutting blade (tip) of the inner cutting blade attached to the through groove.

EXPLANATION OF REFERENCE NUMBERS

C core cutter
1 body portion
2 cutting blade
2A inner cutting blade
2B outer cutting blade
3 through groove
4 gullet

BEST MODE FOR CARRYING OUT THE INVENTION

Hereinafter, a core cutter according to an embodiment of the present invention will be specifically explained in reference to the drawings. However, the present invention is not limited to the embodiment.

Embodiment

Figure 1:
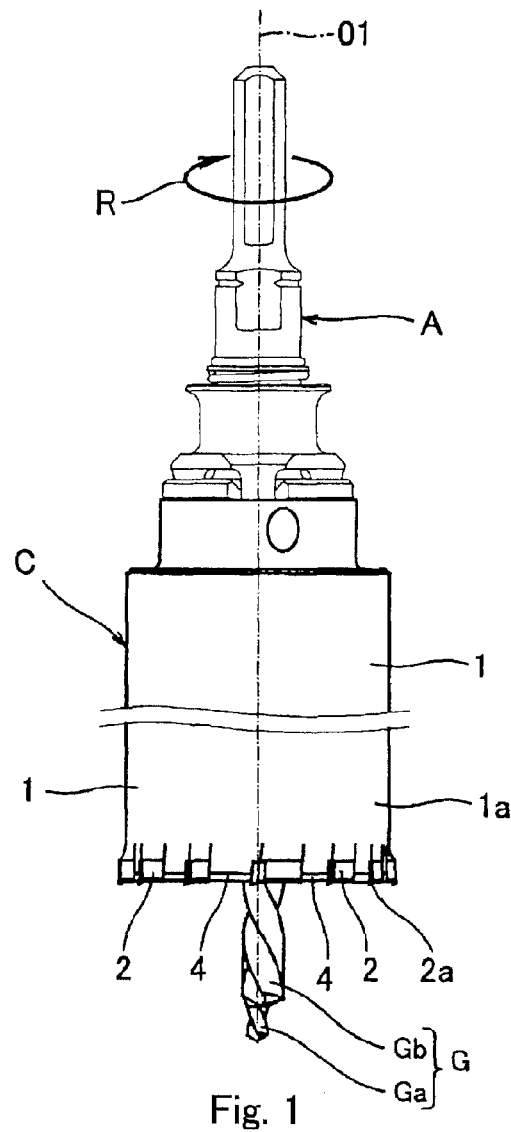
FIG. 1 is a side view showing a core cutter of Embodiment of the present invention by a line of normal thickness and showing by a thin line an arbor (attachment member) to a lower portion of which the core cutter is attached.

As shown in FIG. 1, a core cutter C according to the present embodiment includes a body portion 1 having a tubular shape (cylindrical shape in the present embodiment) and cutting blades 2 each formed such that a tip end portion 2a thereof is implanted in a tip end portion (lower end portion in FIG. 1) 1a of the body portion 1 so as to project toward a tip end side of the core cutter C. Moreover, reference letter "A" shown by a thin line in FIG. 1 denotes an arbor used to attach the core cutter C to a drilling machine (not shown), such as a drill press, and reference letter "G" denotes a center drill used for positioning when drilling holes.

Figure 2:
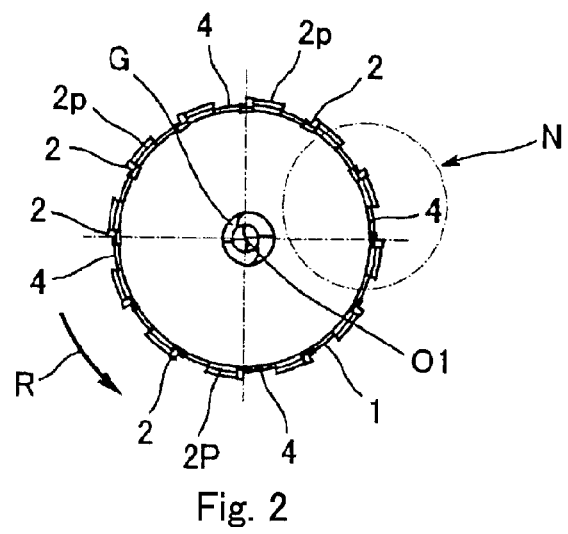
FIG. 2 is a bottom view of the core cutter and shows an arrangement of cutting blades of the core cutter shown in FIG. 1, gullets provided adjacent to the cutting blades, a center drill, and the like when viewed from a bottom surface of the core cutter.

The cutting blade 2 is formed separately from the body portion 1 and has a block form. As shown in FIG. 2, a plurality of blocks forming the cutting blades 2 are arranged at a ring-shaped tip end of the body portion 1 at suitable intervals such that a circumferential-direction tip end of each cutting blade 2 is located on a rotational-direction-R tip end side of the body portion 1. For example, in the present embodiment, twelve cutting blades 2 are arranged at the tip end of the body portion 1 so as to be spaced apart from one another in the rotational-direction-R. Moreover, some of the cutting blades 2 are arranged at unequal intervals in the rotational-direction-R. However, the number of cutting blades 2 is not limited to twelve, and all the cutting blades 2 may be arranged at equal intervals.

Figure 3:
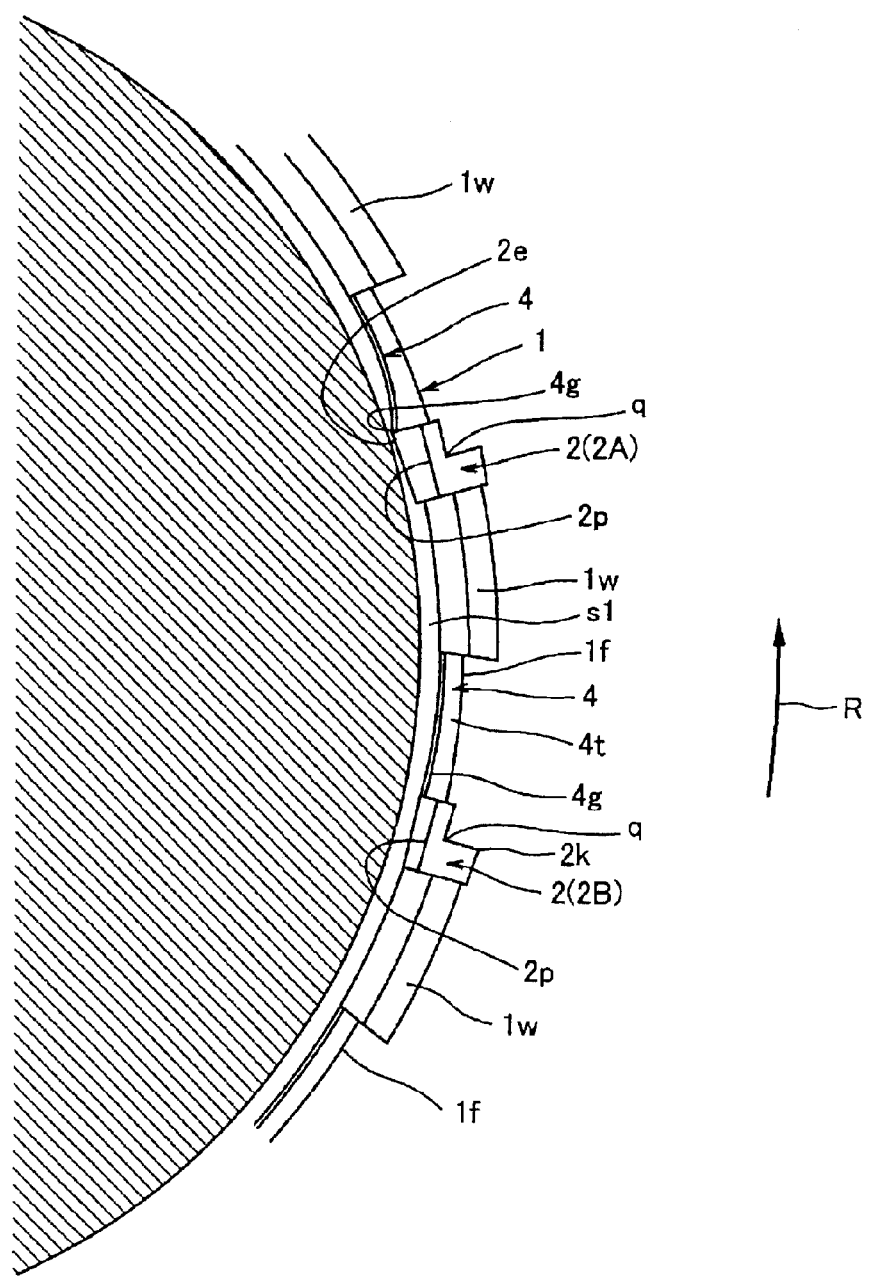
Figure 4:
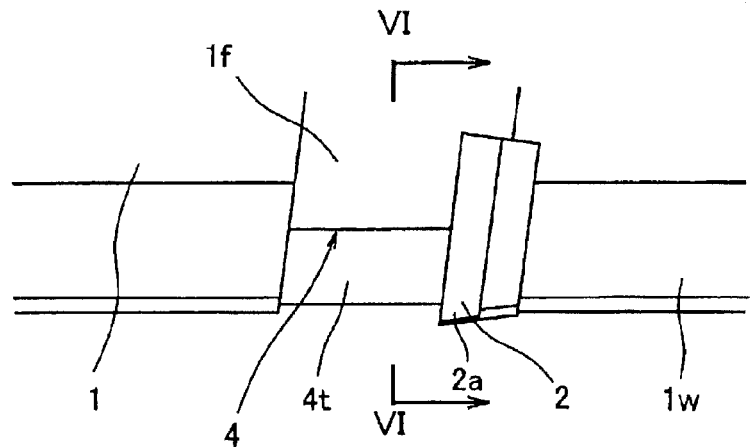

As shown in an enlarged view of FIG. 3, the cutting blades 2 each having the block form includes two types of cutting blades 2, i.e., inner cutting blades 2A and outer cutting blades 2B. The inner cutting blade 2A has a predetermined width in a radial direction and is arranged to deviate toward a radially inner side of the core cutter C so as to be able to cut a portion located on a width-direction (radial-direction) inner peripheral region of a cut trajectory (cut mark) in a ring shape. The outer cutting blade 2B has a predetermined width in the radial direction and is arranged to deviate toward a radially outer side of the core cutter C so as to be able to cut a portion located on a width-direction outer peripheral region of the cut trajectory in a ring shape. Moreover, both the inner cutting blade 2A and the outer cutting blade 2B can cut a center region of the cut trajectory.

Figure 6:
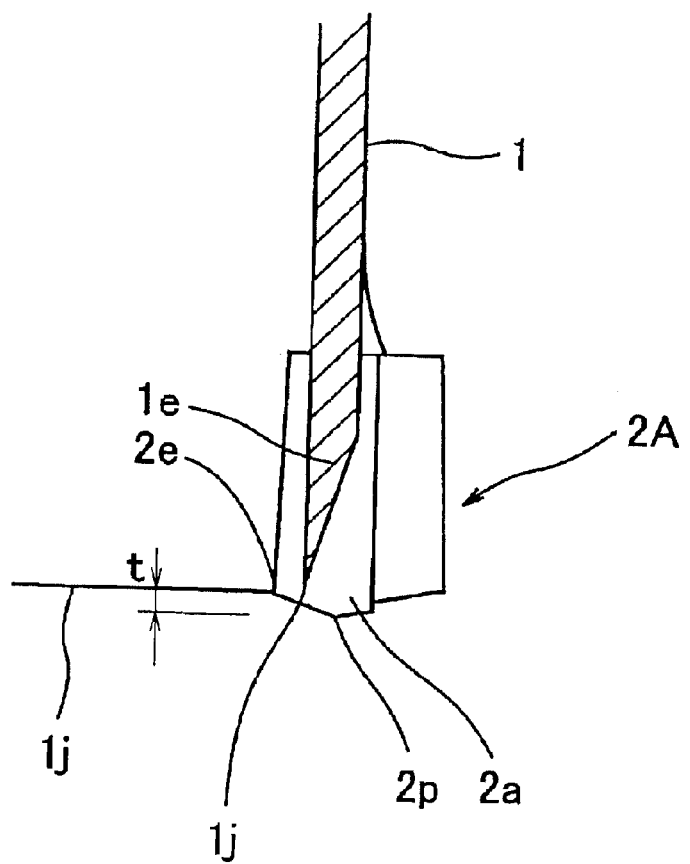
FIG. 6 is a cross-sectional view when viewed from a direction indicated by arrows VI-VI of FIG. 4 and shows the configuration of the tip end portion of the body portion and the configuration of the cutting blade (inner cutting blade) which is provided in a through groove formed at the tip end portion and deviates toward the radially inner side of the core cutter.
Figure 7:
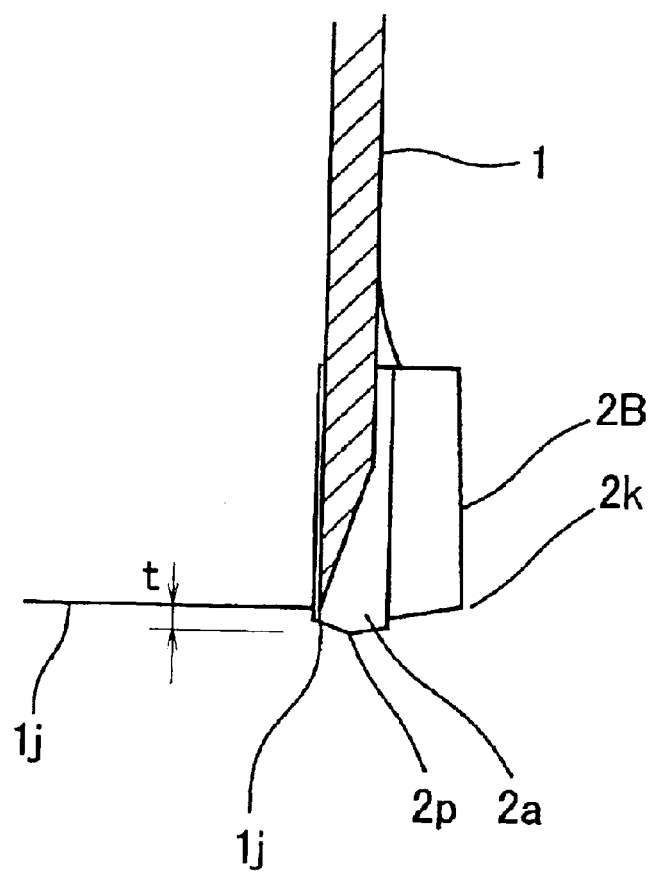
FIG. 7 is a cross-sectional view of the other cutting blade when viewed from the same direction as the direction indicated by the arrows VI-VI of FIG. 4 and shows the configuration of the tip end portion of the body portion and the configuration of the cutting blade (outer cutting blade) which is provided outside the through groove formed at the tip end portion.

For example, in the present embodiment, the cutting blade 2 having the appearance configuration shown in FIG. 12 is arranged at the body portion 1 as the inner cutting blade 2A such that as shown in FIGS. 3 and 6, a radially inner end 2e thereof projects toward the radially inner side of the core cutter C. Moreover, in the present embodiment, the cutting blade 2 having the appearance configuration shown in FIG. 11 is arranged at the body portion 1 as the outer cutting blade 2B such that as shown in FIGS. 3 and 7, a radially outer end 2k thereof projects toward the radially outer side of the core cutter C. Then, as shown in the enlarged view of FIG. 3, the radially inner end 2e of the inner cutting blade 2A is configured to project toward the radially inner side of the core cutter C more than a radially inner end of the outer cutting blade 2B, and the radially outer end 2k of the outer cutting blade 2B is configured to project toward the radially outer side of the core cutter C more than a radially outer end of the inner cutting blade 2A.

Then, as shown in FIGS. 6 and 7, in the present embodiment, a projection length t of the inner cutting blade 2A and a projection length t of the outer cutting blade 2B are equal to each other. The projection length t is a length of projection from an axial-direction tip end lj of the body portion 1 toward a tip end side of each of the inner cutting blade 2A and the outer cutting blade 2B.

Figure 8:
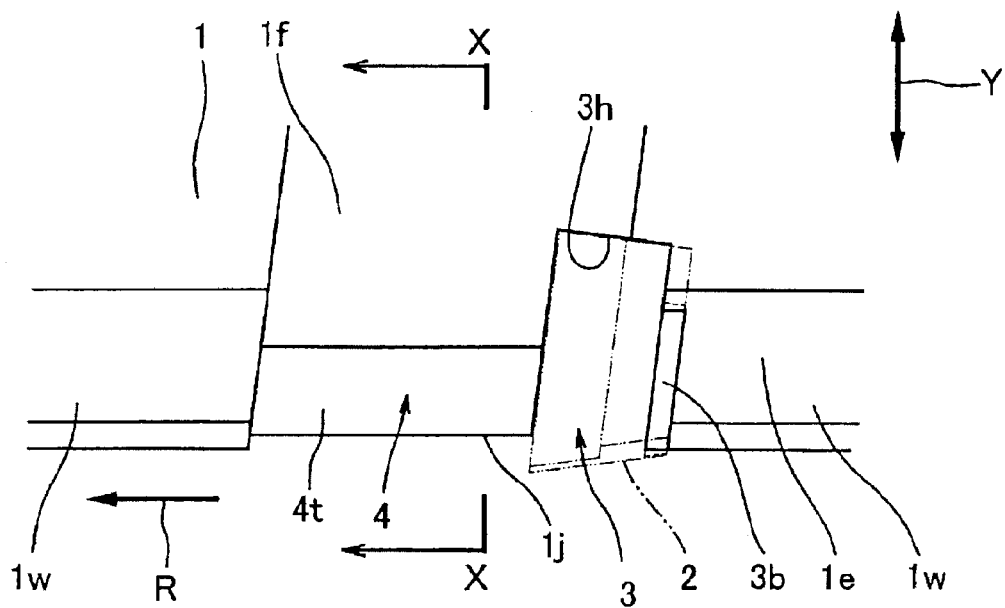
FIG. 8 is a partially enlarged side view of the core cutter and shows the configuration of the through groove in which the block is not yet provided and the configuration of the vicinity of the through groove (the configuration of a lower end portion of the body portion).
Figure 9:
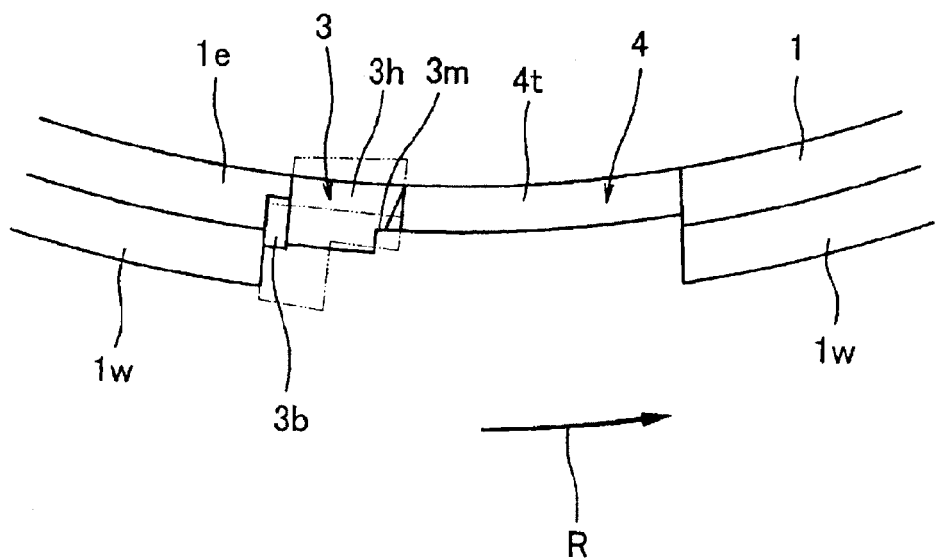
FIG. 9 is a partially enlarged bottom view when viewed from the bottom surface of the core cutter and shows the configuration of the through groove shown in FIG. 8 and the configuration of the vicinity of the through groove.

As shown in FIGS. 8 and 9, in the core cutter C according to the present embodiment, the block forming the cutting blade 2 is attached to (implanted in) and welded to a through groove 3. The through groove 3 opens toward the tip end 1j side (see FIG. 8) of the body portion 1 and penetrates the body portion 1 in the radial direction (thickness direction) of the body portion 1. With this, as shown in FIGS. 1 to 7, the block forming the cutting blade 2 is attached to the tip end 1j of the body portion 1 so as to be integral with the body portion 1. In the present embodiment, the block forming the cutting blade 2 is integrally attached to the body portion 1 by so-called "brazing". However, this attachment is not limited to the "brazing", and for example, welding other than "brazing" may be carried out, or bonding using a metal adhesive may be carried out.

Figure 10:
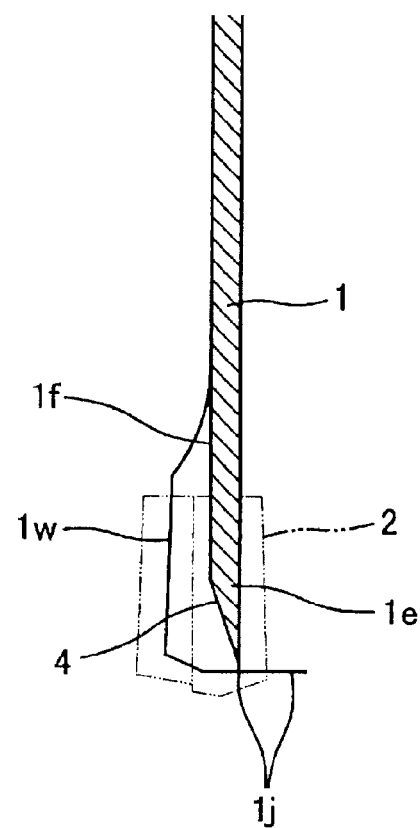
FIG. 10 is a cross-sectional view when viewed from a direction indicated by arrows X-X of FIG. 8 and shows the configuration of the gullet and the configuration of a thick portion located in front of the gullet in a rotational direction of the core cutter.
Figure 11C:
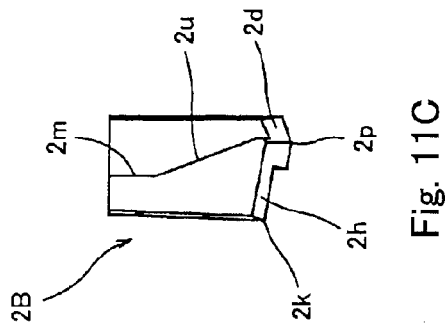
FIG. 11(C) is a diagram when viewed from a rear side of the core cutter in the rotational direction.
Figure 11D:
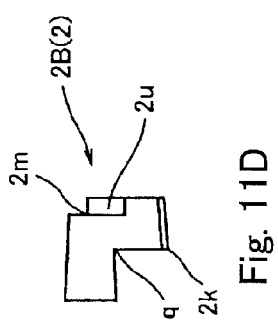
FIG. 11(D) is a plan view.
Figure 11A:
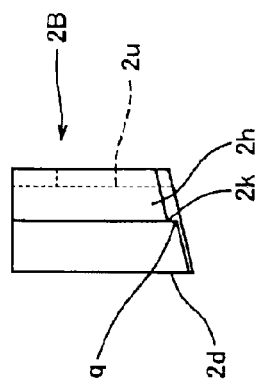
FIG. 11(A) is a side view showing the outer cutting blade attached to the through groove when viewed from a radially outer side of the core cutter.
Figure 11E:
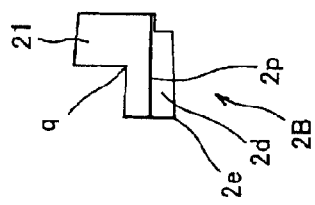
FIG. 11(E) is a bottom view (diagram when viewed from a tip end side of the core cutter).
Figure 11B:
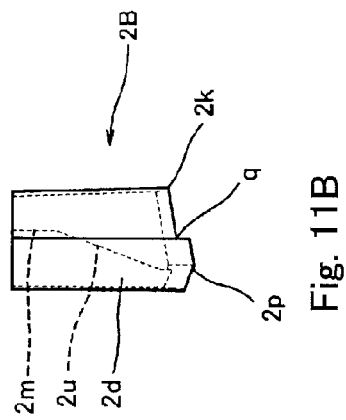
FIG. 11(B) is a diagram when viewed from a front side of the core cutter in the rotational direction.
Figure 12C:
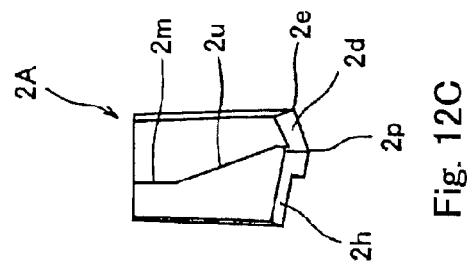
FIG. 12(C) is a diagram when viewed from the rear side of the core cutter in the rotational direction.
Figure 12D:
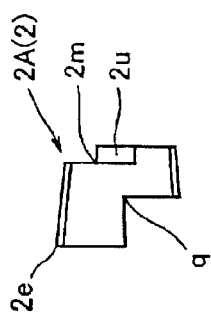
FIG. 12(D) is a plan view.
Figure 12A:
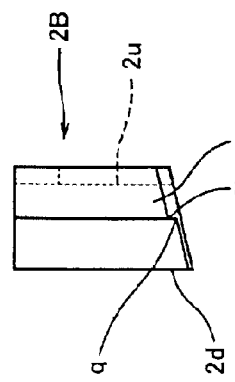
FIG. 12(A) is a side view showing the inner cutting blade attached to the through groove when viewed from the radially outer side of the core cutter.
Figure 12E:
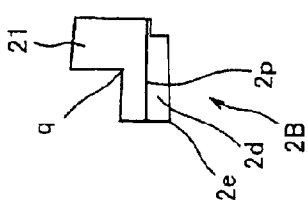
FIG. 12(E) is a bottom view (diagram when viewed from the tip end side of the core cutter).
Figure 12B:
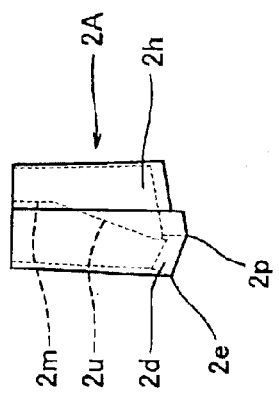
FIG. 12(B) is a diagram when viewed from the front side of the core cutter in the rotational direction.

In the present embodiment, the through groove 3 is configured as shown in FIGS. 8 to 10. To be specific, the through groove 3 is formed at a tip end portion 1e of the body portion 1 so as to penetrate the body portion 1 and open toward a tip end side (lower side in FIG. 8) of the body portion 1. As shown in a side view of FIG. 8, the through groove 3 is formed in a rectangular shape which substantially inclines along an inclined axis inclining such that a tip end (lower end in FIG. 8) thereof in an axial direction Y (see FIG. 8) is located on a rotational-direction-R front side of a base end (upper end in FIG. 8) thereof. Moreover, an inclined surface 3b inclining such that a base end thereof is located on an outer peripheral side of the body portion 1 and a tip end thereof is located on an inner peripheral side of the body portion 1 is formed at a rotational-direction rear end portion of the substantially rectangular shape of the through groove 3 so as to have a predetermined length from the tip end of the body portion 1 toward a base end of the body portion 1. In the present embodiment, the predetermined length of the inclined surface 3b is about 70% of an axial length of the portion penetrating the body portion 1 to have the substantially rectangular shape.

Moreover, the inclined surface 3b faces in a direction different from a direction in which a base end side surface 3h of the opening having the substantially rectangular shape in the side view faces.

Moreover, as shown in FIG. 9, the through groove 3 is formed such that when viewed from the bottom surface of the core cutter C, the positions of both ends of a radially inner side portion thereof and the positions of both ends of a radially outer side portion thereof are displaced from each other in a circumferential direction, and a step 3m is formed at this displaced portion. Therefore, a surface facing in a direction different from the directions in which the above surfaces face is formed at a connection portion at which the step 3m is formed.

By the above configuration having the surfaces facing in the different directions from one another, the cutting blade 2 is accurately placed at a predetermined position in a radially outward direction, a radially inward direction, and the circumferential direction. Therefore, when attaching the cutting blade 2 to the through groove 3, the cutting blade 2 is attached in a direction from a bottom surface side (axial-direction tip end side) of the body portion 1 toward a base end side of the body portion 1. With this, the cutting blade 2 is easily set in the through groove 3 so as to be accurately placed at a predetermined position in respective directions.

As shown in FIGS. 1 to 5, a gullet (discharging groove) 4 configured to discharge chips is formed on a rotational-direction-R front side of the through groove 3. In the present embodiment, an axial-direction tip end portion of the gullet 4 is formed by a tapered curved surface 4t. The tapered curved surface 4t is formed such that an outer peripheral surface if that is a part of the body portion 1 gradually approaches to an inner peripheral surface of the body portion 1 as the outer peripheral surface if extends toward the tip end of the body portion 1. Moreover, an axially base end of the tapered curved surface 4t of the gullet 4 is connected to a curved surface (outer peripheral surface) of a straight portion of the outer peripheral surface if of the body portion 1.

Then, a radial-direction size (thickness) of the body portion 1 is such a thickness t that the entire body portion 1 can maintain its distortion resistance with respect to the drilling. In the present embodiment, the thickness of the body portion 1 is about 80 to 95% of the thickness of the same type of conventional core cutter.

Then, as shown in FIGS. 8 and 9, a thick portion 1w is formed at a portion which is located at an axial-direction tip end of the body portion 1 and on a rotational-direction-R rear side of the through groove 3. The thick portion 1w is formed such that the outer peripheral surface if of the body portion 1 partially projects toward the radially outer side of the body portion 1 only at this portion. A rotational-direction rear end of the thick portion 1w extends to a front end of the adjacent gullet 4. To be specific, a rotational-direction front end surface of the thick portion 1w supports a rotational-direction rear end surface of the cutting blade 2 in the circumferential direction.

Therefore, as shown in FIG. 2 and the like, plural sets of the thick portion 1w, the gullet 4, and the through groove 3 are arranged in this order in the rotational direction at the axial-direction tip end portion of the core cutter C according to the present embodiment. Specifically, for example, in the present embodiment, twelve sets of the thick portion 1w, the gullet 4, and the through groove 3 are formed in this order in the rotational direction. However, the number of sets of these is not limited to twelve, and a suitable number of sets of these may be selected depending on the diameter of the core cutter C, a target object to be drilled, and the like.

Moreover, as shown in the enlarged view of FIG. 3, the cutting blades 2 (2A, 2B) including the inner cutting blades 2A and the outer cutting blades 2B are attached to the through grooves 3. In this case, each cutting blade 2 (2A,2B) is formed consecutively on a rotational direction R rear side of the gullet 4 in the rotational direction R such that the radially inner end 2e located at the axial-direction tip end and the rotational-direction-R front end coincides with and contacts, in the radial direction, a portion located at the axial-direction tip end of the tapered curved surface 4t of the gullet 4 and a rotational-direction-R rear end of the tapered curved surface 4t of the gullet 4 (to be precise, a surface 4g located on an inner peripheral side of the curved surface 4t). However, instead of the above configuration, the radially inner end 2e may substantially coincide with the above portion. For example, the surface 4g of the curved surface 4t may be located on a slightly radially outer side as compared to the inner end 2 of the cutting blade 2.

Moreover, as shown in FIGS. 2 and 3, an edge line 2p extending in the rotational direction R is formed at the axial-direction tip end of each of the inner cutting blade 2A and the outer cutting blade 2B. In the present embodiment, the positions of the edge lines 2p are located so as to coincide with one another in the radial direction about a rotational center O1 (see FIG. 2). In other words, the edge lines 2p are formed to move along the same rotation trajectory. Moreover, as shown in FIGS. 6 and 7, a rotational-direction tip end of each edge line 2p is an axial-direction extreme tip end of the cutting blade 2.

Moreover, as shown in FIGS. 11 and 12, the cutting blade 2, i.e., each of the inner cutting blade 2A and the outer cutting blade 2B includes a radially inner cutting blade portion 2d configured to cut an inner peripheral side portion and a radially outer cutting blade portion 2h adjacently located on the radially outer side of the radially inner cutting blade portion 2d and configured to cut an outer peripheral side portion. Then, a rotational-direction tip end of the radially outer cutting blade portion 2h is located behind a rotational-direction tip end of the radially inner cutting blade portion 2d corresponding to this radially outer cutting blade portion 2h. In addition, when viewed from the bottom surface, a radial-direction boundary line q between the radially inner cutting blade portion 2d and the radially outer cutting blade portion 2h forms a step in the rotational direction.

Moreover, as shown in FIGS. 11 and 12, the cutting blade 2 has an inclined surface 2u and a step 2m. The inclined surface 2u contacts the inclined surface 3b of the through groove 3, and the step 2m contacts the step 3m of the through groove 3.

Figure 5:
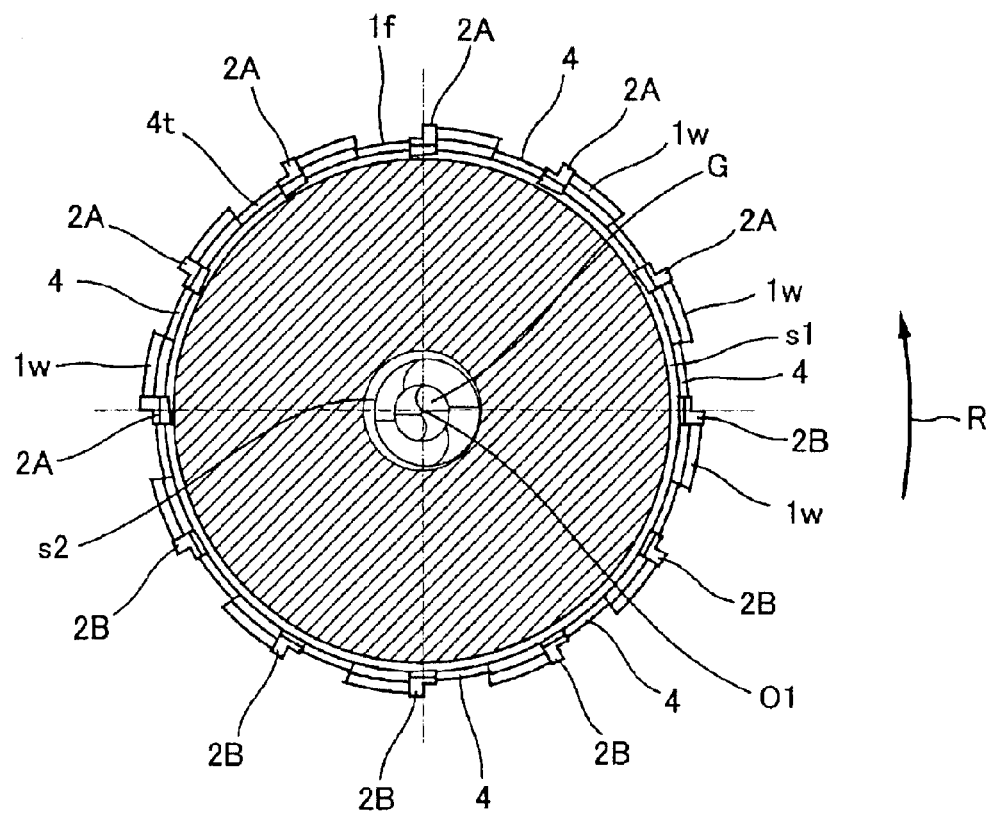
FIG. 5 is a diagram showing a substantially cylindrical cut portion remaining on a radially inner side of the core cutter in the case of drilling a hole using the core cutter configured as shown in FIG. 2, and also showing the configuration of the core cutter when viewed from the bottom surface of the core cutter.

In the present embodiment, as shown in FIG. 5, the inner cutting blades 2A are arranged in a region in the circumferential direction, and the outer cutting blades 2B are also arranged in the remaining region in the circumferential direction. Specifically, in the present embodiment, assuming that the upward side in FIG. 5 is "12:00", the inner cutting blades 2A are arranged in the region from "9:00" to "2:30", and the outer cutting blades 2B are arranged in the remaining region in the circumferential direction.

However, instead of this configuration, at least one inner cutting blade 2A may be arranged, or the inner cutting blades 2A may be arranged in a region equal to or smaller than half the entire region of the body portion 1.

As shown in FIGS. 1, 2, and 5, so-called "center drill" G determining the rotational center for drilling is provided at a portion of the rotational center O1 of the core cutter C. The center drill G is formed as so-called "stepped drill" configured by coupling two drills of different diameters in the axial direction. A rotational center of a small-diameter drill Ga located on a tip end side coincides with the rotational center O1 of the core cutter C. A rotational center of a large-diameter drill Gb located on a base end side is displaced from the rotational center O1. A direction of this displacement is a direction toward a side across the rotational center O1 from a side where the inner cutting blades 2A are arranged. To be specific, the center of the large-diameter drill Gb deviates so as to be away from the side where the inner cutting blades 2A are arranged.

The core cutter C configured as above functions as below. To be specific, the cutting blades 2 are welded to the through grooves 3 of the body portion 1 at predetermined intervals at the axial-direction tip end of the body portion 1, and with this, all of these components form an uninterrupted ring shape when viewed from the bottom surface. Since the cutting blades 2 and the body portion 1 are strongly and integrally formed in the ring shape as above, external force applied to the cutting blades 2 is distributed to the cutting blades 2 and the body portion 1. As a result, the distortion resistance can be improved. Therefore, the thickness (radial-direction thickness) of the body portion 1 can be reduced as much as possible. On this account, the radial-direction size of the cutting blade 2 arranged at the tip end of the body portion 1 can also be reduced.

As a result, by drilling a hole using the core cutter C, a total cut amount can be reduced, so that cut efficiency can be improved.

In addition, when attaching the cutting blade 2 to the through groove 3, the positioning of the cutting blade 2 is carried out such that three surfaces of the through groove 3 which surfaces face in different directions respectively contact three surfaces of the cutting blade 2 which surfaces face in different directions. Therefore, by simply attaching the cutting blade 2 to through groove 3 such that respective surfaces contact each other, the cutting blade 2 can be attached to through groove 3 so as to be accurately positioned in the directions of three dimensions.

Moreover, as described above, in the case where the uninterrupted ring shape is adopted to reduce the thickness of the body portion 1 when viewed from the bottom surface, an inner peripheral end of a rotational-direction front end of the cutting blade 2 and a rotational-direction rear end of the gullet 4 coincide with each other. Therefore, various chips of the composite material cut by the cutting blade 2 are efficiently discharged to outside along the peripheral surface of the gullet 4 provided adjacently just in front of the cutting blade 2. Moreover, as described above, since the cutting blade 2 is constituted by the radially outer cutting blade portion 2h and the radially inner cutting blade portion 2d which are formed like a step in the rotational direction, the size of each chip is half in the width direction. Therefore, the chips are further efficiently discharged through the gullets 4 and the like.

Further, as described above, at least one inner cutting blade 2A is arranged, or the inner cutting blades 2A are arranged in a region equal to or smaller than half the ring-shaped region of the tip end of the body portion 1 in the circumferential direction. With this, as shown in FIGS. 3 and 5, an efficient gap s1 is formed between a remaining columnar scrap (hatched portion in FIGS. 2 and 3) formed by drilling and the inner peripheral surface of the core cutter C. Moreover, by configuring the center drill G as in the present embodiment, an efficient gap s2 is formed between the center drill G and the remaining columnar waste formed by drilling. As a result, by drilling a hole using the core cutter C, the remaining scrap (doughnut-shaped remaining scrap in FIG. 2) formed in a space on an inner peripheral side of the core cutter C can be easily taken out.

The present invention is not limited to the present embodiment. Needless to say, various modifications can be made as long as those are obvious to one skilled in the art.

INDUSTRIAL APPLICABILITY

The core cutter according to the present invention can be used as a cutting tool to, for example, drill a composite material and the like.

The invention claimed is:

1. A core cutter comprising: a tubular body portion; and a plurality of cutting blades arranged at a tip end of the body portion at predetermined intervals in a circumferential direction, at least one of the cutting blades serving as an inner cutting blade configured to cut an inner peripheral side portion, the remaining cutting blades serving as outer cutting blades configured to cut an outer peripheral side portion, wherein:

a radial-direction thickness of the body portion is arranged to maintain distortion resistance of the body portion;

through grooves configured to penetrate the body portion in the radial direction are formed at the tip end of the body portion so as to open toward a tip end side of the core cutter;

the cutting blades are respectively attached to the through grooves, each of the cutting blades having a circumferential-direction size equal to a circumferential-direction size of the through groove and being constituted by a block separately from the body portion;

each of gullets configured to discharge chips is formed on a rotational-direction front side of the cutting blade, each of the gullets being formed by an outer peripheral surface that is a part of the body portion, the outer peripheral surface having a tapered curved surface formed such that the outer peripheral surface approaches to an inner peripheral surface that is a part of the body portion as the outer peripheral surface extends toward the tip end of the body portion;

the cutting blades are respectively welded to the through grooves such that a radially inner end of an axial-direction tip end portion of each of the cutting blades coincides with an axial-direction tip end portion of the gullet in the radial direction, the radially inner end located at the rotational-direction front side; and a configuration in which the radially inner end of the axial-direction tip end portion of the cutting blade coincides with the axial-direction tip end portion of the gullet is realized such that a connection portion where the axial-direction tip end portion of the gullet and the cutting blade are connected to each other in the circumferential direction is curved or bent in the radial direction so as to correspond to a position of the radially inner end of the cutting blade.

2. The core cutter according to claim 1, wherein the outer peripheral surface of the body portion which surface forms the gullet is connected to the inner peripheral surface that is a part of the body portion so as to coincide with or substantially coincide with the inner peripheral surface in the radial direction at an axial-direction tip end of the body portion.

3. The core cutter according to claim 1, wherein: the cutting blade includes a radially inner cutting blade portion configured to cut the inner peripheral side portion and a radially outer cutting portion located on a radially outer side of the radially inner cutting blade portion and configured to cut the outer peripheral side portion; in a rotational direction, a cutting blade portion located at a rotational-direction tip end of the radially outer cutting blade portion is located behind a cutting blade portion located at a rotational-direction tip end of the radially inner cutting blade portion; and when viewed from a bottom surface of the core cutter, a radial-direction boundary between the radially inner cutting blade portion and the radially outer cutting blade portion is formed by a step formed in the rotational direction.

4. The core cutter according to claim 1, wherein a thick portion is formed at a portion located on a rotational-direction rear side of the through groove at the tip end of the body portion, the thick portion being configured such that an outer peripheral surface thereof is located on a radially inner side of a radial-direction thickness of the cutting blade provided at the through groove and located on a radially outer side of a peripheral surface of the gullet.

5. The core cutter according to claim 1, wherein: the through groove has a plurality of contact surfaces configured to face in different directions from one another and contact the cutting blade when the cutting blade is attached to the through groove; the cutting blade has a plurality of contact surfaces corresponding to the contact surfaces of the through groove; and a block that is the cutting blade is welded to the through groove such that the contact surfaces of the cutting blade respectively contact the contact surfaces of the through groove.

6. The core cutter according to claim 1, wherein a plurality of the cutting blades serving as the inner cutting blades are arranged in a region equal to or smaller than half an entire region of the core cutter in the circumferential direction or arranged in a region substantially half the entire region of the core cutter in the circumferential direction.

7. The core cutter according to claim 6, further comprising: a first center drill portion having a center located at a rotational center portion of the core cutter and configured to be located on an axial-direction tip end side of the core cutter; and a second center drill portion configured to be located on an axial-direction rear end side of the first center drill portion and displaced from the rotational center portion, and further configured such that an outer end of a rotation trajectory thereof is larger than an outer end of a rotation trajectory of the first center drill portion in the radial direction, wherein the center drills configured to fulfill a positioning function when drilling are arranged such that the second center drill portion is displaced toward a side across the rotational center from a side where the inner cutting blades are arranged in the circumferential direction.

* * * * *